US008960915B2

(12) United States Patent
Tominaga et al.

(10) Patent No.: US 8,960,915 B2
(45) Date of Patent: Feb. 24, 2015

(54) OPTICAL ELEMENT, LIGHT SOURCE DEVICE, AND PROJECTION DISPLAY DEVICE

(75) Inventors: Shin Tominaga, Tokyo (JP); Masao Imai, Tokyo (JP); Goroh Saitoh, Tokyo (JP); Masanao Natsumeda, Tokyo (JP)

(73) Assignee: NEC Corporation, Tokyo (JP)

( * ) Notice: Subject to any disclaimer, the term of this patent is extended or adjusted under 35 U.S.C. 154(b) by 204 days.

(21) Appl. No.: 13/580,500

(22) PCT Filed: Mar. 28, 2011

(86) PCT No.: PCT/JP2011/057630
§ 371 (c)(1),
(2), (4) Date: Aug. 22, 2012

(87) PCT Pub. No.: WO2011/122555
PCT Pub. Date: Oct. 6, 2011

(65) Prior Publication Data
US 2012/0314188 A1 Dec. 13, 2012

(30) Foreign Application Priority Data

Mar. 30, 2010 (JP) .................................. 2010-077794

(51) Int. Cl.
*G03B 21/14* (2006.01)
*B82Y 20/00* (2011.01)
(Continued)

(52) U.S. Cl.
CPC ................. *G03B 21/14* (2013.01); *B82Y 20/00* (2013.01); *G02B 5/008* (2013.01); *G02B 5/1814* (2013.01);
(Continued)

(58) Field of Classification Search
USPC ........................ 353/20, 31, 34, 38, 82, 84, 98; 359/485.01–485.03, 485.05, 486.01, 359/487.03, 489.01; 349/5, 7–9, 96, 99, 349/102; 348/743–747, 751–752, E9.027
See application file for complete search history.

(56) References Cited

U.S. PATENT DOCUMENTS

2003/0184989 A1 10/2003 Matsumoto et al.
2004/0120041 A1* 6/2004 Silverstein et al. ........... 359/486
(Continued)

FOREIGN PATENT DOCUMENTS

CN 1716024 A 1/2006
CN 103081134 A 5/2013
(Continued)

OTHER PUBLICATIONS

The international search report for PCT/JP2011/057630 dated Apr. 26, 2011.
Chinese Office Action for CN Application No. 201180017982.X issued on Mar. 5, 2014 with English Translation.
Japanese Office Action for JP Application No. 2012-508310 mailed on Dec. 16, 2014 with English Translation.

*Primary Examiner* — Sultan Chowdhury
(74) *Attorney, Agent, or Firm* — Sughrue Mion, PLLC (57) ABSTRACT

Optical element 10 according to the present invention comprises light guide body 11, surface plasmon excitation means 14 that is provided on the interface with light guide body 11 and that allows surface plasmon to be excited by a specific polarization component of light whose polarization direction is orthogonal to the first direction y in the surface of light guide body 11, from among light entering from light guide body 11, and a light generation means that includes metal layer 12 and cover layer 13, and that generates light having the same polarization component as the specific polarization component of light, from surface plasmon produced in the interface between metal layer 12 and cover layer 13 in response to surface plasmon excited by the specific polarization component in surface plasmon excitation means 14. Surface plasmon excitation means 14 includes a plurality of protrusions 14a, each of which extends in the first direction y and is periodically arrayed along the second direction x orthogonal to the first direction y.

30 Claims, 10 Drawing Sheets

(51) Int. Cl.
  *G02B 5/00* (2006.01)
  *G02B 5/18* (2006.01)
  *G02B 5/30* (2006.01)
  *G02B 5/32* (2006.01)
  *F21V 8/00* (2006.01)
  *G02B 6/122* (2006.01)
  *G02B 27/42* (2006.01)
  *H04N 9/31* (2006.01)
  *G03B 21/20* (2006.01)
  *G02F 1/1335* (2006.01)

(52) U.S. Cl.
  CPC ............ *G02B 5/1866* (2013.01); *G02B 5/3041* (2013.01); *G02B 5/305* (2013.01); *G02B 5/3058* (2013.01); *G02B 5/32* (2013.01); *G02B 6/0038* (2013.01); *G02B 6/005* (2013.01); *G02B 6/1226* (2013.01); *G02B 27/425* (2013.01); *G02B 27/4261* (2013.01); *G02B 27/4272* (2013.01); *H04N 9/3167* (2013.01); *G03B 21/2033* (2013.01); *G03B 21/2073* (2013.01); *G02F 1/13362* (2013.01)
  USPC .................. 353/20; 353/31; 353/34; 353/84; 353/98; 359/485.01; 359/485.02

(56) References Cited

U.S. PATENT DOCUMENTS

| | | | |
|---|---|---|---|
| 2007/0217008 A1* | 9/2007 | Wang et al. | 359/486 |
| 2009/0231702 A1* | 9/2009 | Wu et al. | 359/487 |
| 2010/0328770 A1* | 12/2010 | Perkins et al. | 359/486 |
| 2012/0086887 A1* | 4/2012 | Lee et al. | 349/62 |

FOREIGN PATENT DOCUMENTS

| | | | |
|---|---|---|---|
| JP | 11-329034 | A | 11/1999 |
| JP | 2001281654 | A | 10/2001 |
| JP | 2003-042946 | A | 2/2003 |
| JP | 2003295183 | A | 10/2003 |
| JP | 2006-313667 | A | 11/2006 |
| JP | 2007-200740 | A | 8/2007 |
| JP | 2007-266095 | A | 10/2007 |
| JP | 2008-020728 | A | 1/2008 |
| JP | 2008-047543 | A | 2/2008 |
| JP | 2009-158479 | A | 7/2009 |
| JP | 2009-239217 | A | 10/2009 |
| JP | 2010-040415 | A | 2/2010 |
| JP | 2010-045329 | A | 2/2010 |
| JP | 5338987 | B2 | 11/2013 |

* cited by examiner

TM polarized light ⟶
TE polarized light ⇢
Surface plasmon polariton 〜➤

TM polarized light ⟶
TE polarized light ┈┈⟶
Surface plasmon polariton ⤳

OPTICAL ELEMENT, LIGHT SOURCE DEVICE, AND PROJECTION DISPLAY DEVICE

TECHNICAL FIELD

The present invention relates to an optical element utilizing surface plasmon, a light source device and a projection display device.

BACKGROUND ART

Recently, a projection display device (LED projector) has been proposed using a light emitting diode (LED) as a light emitting element for a light source.

An LED projector requires an image display with high brightness, and for this purpose it is essential that etendue determined by the light emitting area and the angle of divergence of the light source not be increased. That is, to utilize light from a light source as projection light, it is necessary for the product of the light emitting area and the angle of divergence of the light source to be smaller than the product of the area of the display element and the acceptance angle (solid angle) determined by the F number of the projection lens. In an optical system where light is projected to a light modulation element, it is accordingly necessary to improve use efficiency of light from a light source by enhancing the directionality of outgoing light.

On the other hand, in an LED projector that displays an image using a light modulation element such as a liquid crystal panel, it is necessary to project a specifically polarized light onto the liquid crystal panel because of polarization dependency of the liquid crystal panel. Therefore, it is also necessary for the above optical system to convert a randomly polarized light from an LED light source into a specifically polarized light and to output it.

Patent Literature 1, as such an optical system, discloses the planar lighting system that converts randomly polarized light from an LED light source into specifically polarized light and outputs it.

This planar lighting system has a polarization separation film provided on the exit side of a light guide plate, which polarization separation film is formed by sandwiching a metal thin film between transparent media having a low refractive index. In this polarization separation film, surface plasmon is excited on a surface of the metal thin film via an evanescent light that is produced when light is totally reflected off an interface between the light guide plate, i.e. the transparent medium having a high refractive index, and the thin film having a low refractive index. Then, light that can excite surface plasmon is only light that has an electric field component parallel to the propagation direction of the surface plasmon and an incidence angle based on dispersion of the permittivity of the medium on both sides of the interface in which the surface plasmon propagates. Further, the exit side and the entrance side have the same configuration (the transparent medium having a high refractive index and the thin film having a low refractive index), which develops an inverse process to the excitation process of surface plasmon on the exit side, thereby allowing a linearly polarized light that excites surface plasmon to be transmitted and other polarization components to be reflected. In such a manner, by transmitting only the linearly polarized light incident on a metal layer at a predetermined incidence angle, which satisfies the excitation condition of surface plasmon, an output of polarized light with an improved directionality is realized.

CITATION LIST

Patent Literature

Patent Literature 1: JP 2003-295183 A

SUMMARY OF INVENTION

Problems to be Solved

When light from a light source enters from one side surface of a light guide plate, and assuming that a surface parallel to an upper or lower surface of the light guide plate is an xy plane, then a part of the light propagates, for example, in an x direction. In the above planar lighting system, however, to improve use efficiency of the light projected from the light source, multiple reflection of light involving angle conversion is caused within the light guide plate, and thereby a part of the light will have a propagation component other than in the x direction. Since such light may also excite surface plasmon, there will be an infinite number of incidence angles which satisfy the excitation condition of surface plasmon not only in a zx plane, but also around a z axis orthogonal to the polarization separation film. Thus, the light passing through the above polarization separation film expands in two dimensions, resulting in increased etendue, and accordingly, improving the use efficiency of light cannot be realized.

On the other hand, when multiple-reflected light in the light guide body propagates parallel to the zx plane and enters the polarization separation film at a predetermined incidence angle, then surface plasmon excited by it propagates parallel to the x direction, and therefore light passing through the above polarization separation film is linearly polarized light having a polarization direction perpendicular to the y direction. However, when multiple-reflected light enters the polarization separation film parallel to a plane other than the zx plane, e.g. a yz plane, and at the predetermined incidence angle, then surface plasmon is excited also in the y direction. Accordingly, the above polarization separation film is undesirable because, by transmitting a polarization component parallel to the y direction as well, the output light is not linearly polarized light.

It is therefore an object of the present invention to provide an optical element capable of converting randomly polarized light from a light source into a specifically polarized light and outputting it without increased etendue.

Solution to Problems

To achieve the above object, an optical element according to the present invention comprises: a light guide body on which light is incident from a light source and which includes a first surface and a second surface opposite to the first surface; a surface plasmon excitation means that is provided on the first surface of said light guide body and that allows surface plasmon to be excited by a specific polarization component of light whose polarization direction is orthogonal to a first direction in the first surface, from among the light entering from said light guide body; a light generation means that includes a metal layer provided in the first surface of said light guide body through said surface plasmon excitation means, and a cover layer provided on a surface of said metal layer opposite to the surface facing said light guide body, and that generates light having the same polarization component as the specific polarization component of light, from surface plasmon produced in an interface between said metal layer and said cover layer in response to surface plasmon excited by the specific polarization component in said surface plasmon excitation means; and a phase modulation layer that is provided within said light guide body and that changes a polarization direction of light propagating within said light guide body, wherein said surface plasmon excitation means is a plurality of protrusions provided in an interface between said light guide body and said metal layer, and each of the plurality of protrusions extends in the first direction and is periodically arrayed along a second direction orthogonal to the first direction in the first surface.

Effects of Invention

The present invention can provide an optical element capable of converting randomly polarized light from a light source into linear polarized light in a specific direction and outputting it without increased etendue.

DESCRIPTION OF EMBODIMENTS

Now, embodiments will be described below with reference to the drawings.

First Embodiment

Figure 1A:
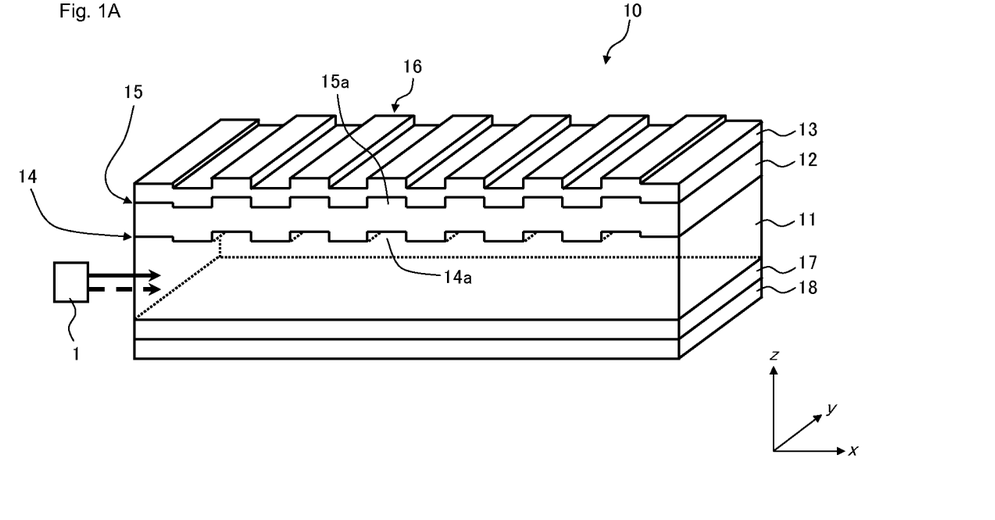
FIG. 1A is a perspective view schematically illustrating an optical element according to a first embodiment.
Figure 1B:
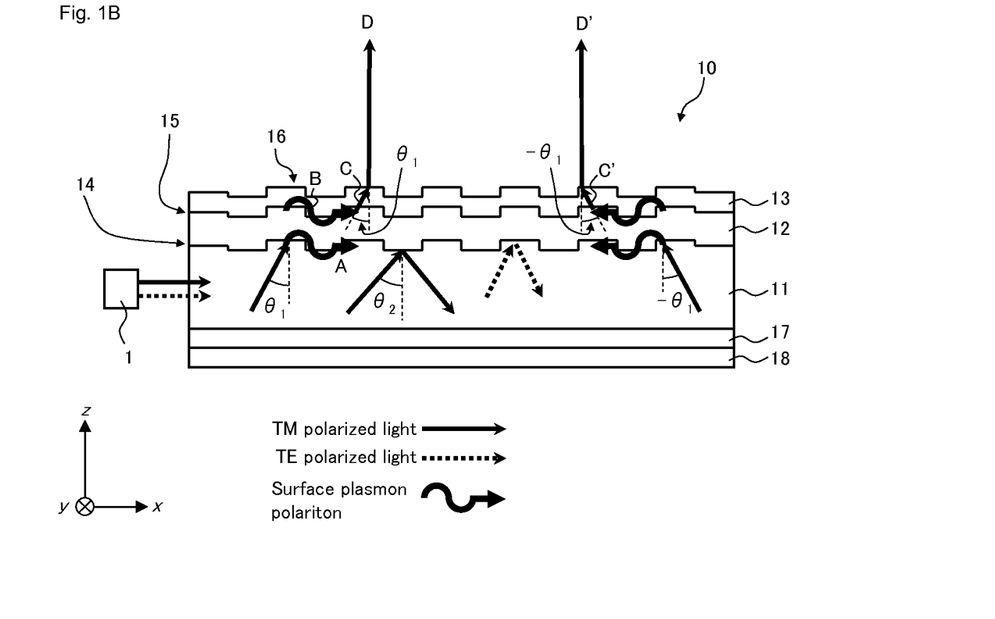
FIG. 1B is a cross-sectional view schematically illustrating the optical element in FIG. 1A.

FIGS. 1A and 1B schematically illustrate an optical element according to a first embodiment. FIG. 1A is a perspective view schematically illustrating the optical element according to this embodiment. FIG. 1B is a cross-sectional view schematically illustrating the optical element according to this embodiment, and shows a cross section taken along a propagation plane in which light propagates within a light guide body accompanied by multiple reflection. In the following description, as shown in FIGS. 1A and 1B, assume that a plane parallel to an upper surface of the light guide body, i.e. an exit surface of the optical element that outputs light is an xy plane, and assume that a direction orthogonal to the exit surface is a z direction. Similarly, assume that an entrance surface is a zx plane, assume that linearly polarized light having a polarization direction parallel to a y direction is a TE polarized light, and assume that a linearly polarized light having a polarization direction perpendicular to the y direction is a TM polarized light. In fact, the actual optical element includes layers each of which is very thin, and between which differences in thickness are large, and therefore it is difficult to show each of the layers in accurate scale and proportion. Thus, it should be noted that each layer is not shown in an actual proportion and is depicted schematically in the drawings.

Optical element 10 according to this embodiment has light guide body 11 on which light is incident from LED light source 1, and on the upper surface (first surface) of this light guide body 11, a means is provided that outputs, in a predetermined direction, the TM polarized light from among light entering from light guide body 11. This means includes metal layer 12, cover layer 13, first diffraction grating 14, second diffraction grating 15 and diffraction means 16. On the side of the lower surface (second surface) of light guide body 11, there are provided λ/4 plate 17 as a wave plate (phase modulation layer) that changes the polarization direction of light by imparting a phase difference to light passing therethrough, and diffuse reflection layer 18 including a diffuser that diffuses and reflects incoming light. In this embodiment, while λ/4 plate 17 is provided on the side of the lower surface of light guide body 11, λ/4 plate 17 may be anything that can change the polarization direction of light propagating in light guide body 11, and it may also be provided on the side of the upper surface or in a central portion of light guide body 11.

Light guide body 11 is a plate-like member made of glass and is configured such that the light entering from LED light source 1, which is a solid state light source provided in an outer periphery of light guide body 11, propagates inside of light guide body 11. Material of light guide body 11 is not limited to glass and may be acrylic resin such as polymethylmethacrylate (PMMA). Further, in the embodiment shown in FIGS. 1A and 1B, optical element 1 is disposed away from LED light source 1, but it may be disposed such that LED light source 1 and light guide body 11 are brought into contact with each other. Alternatively, optical element 1 may be configured such that LED light enters light guide body 11 from the LED light source provided outside through a light guiding means such as a rod integrator. Additionally, in the embodiment shown in FIGS. 1A and 1B, the LED light is configured to enter from light source 1 parallel to light guide body 11, but the LED light may be configured to enter at a slant relative to light guide body 11.

On the upper surface of light guide body 11, there are provided metal layer 12 made of Ag, and cover layer 13 made of glass having the same permittivity as that of light guide body 11.

In the interface between metal layer 12 and light guide body 11, there is provided first diffraction grating 14 that includes a plurality of protrusions 14a periodically arrayed along the x direction (second direction), each of which extends in the y direction (first direction). This first diffraction grating 14 functions as a surface plasmon excitation means that allows surface plasmon to be excited by light incident on metal layer 12 at a predetermined incidence angle, from among the randomly polarized light propagating in light guide body 11. This will be described below.

In the interface between metal layer 12 and cover layer 13, there is provided second diffraction grating 15 having the same configuration as first diffraction grating 14. That is, protrusion 15a of second diffraction grating 15 has the same shape as that of protrusion 14a of first diffraction grating 14, and a plurality of protrusions 15a are periodically arrayed at the same interval as that of protrusions 14a of first diffraction grating 14 along the x direction. Metal layer 12 and cover layer 13, including this second diffraction grating 15, function as a light generation means that generates light from surface plasmon produced in first diffraction grating 14. This will be also described below.

In the exit surface of optical element 10, diffraction means 16 is provided. Diffraction means 16 is formed on the upper surface of cover layer 13, and diffracts, in a predetermined direction, light output by the above light generation means, i.e. light output from cover layer 13 to an air layer. Diffraction means 16, similarly to first and second diffraction gratings 14, 15, includes a plurality of structures periodically arrayed along the x direction, and each of the plurality of structures is configured to extend in the y direction.

Next, the principle will be described that first diffraction grating 14, which is the surface plasmon excitation means according to this embodiment, allows surface plasmon to be excited by light, and metal layer 12, cover layer 13 and second diffraction grating 15, which constitute the light generation means, generate light with the surface plasmon.

Surface plasmon is a compressional wave of an electron that propagates in an interface between dielectric material and metal, and the dispersion relation between its wave number and angular frequency is determined by permittivities of the dielectric material and the metal. When the dispersion relation of this surface plasmon conforms to the dispersion relation of light existing in the dielectric material, that is, when the wave number of the light in the dielectric material is equal to the wave number of the surface plasmon, then surface plasmon is excited by the light. However, generally, when the interface between dielectric material and metal is flat, the dispersion relation of surface plasmon does not conform to the dispersion relation of light existing in the dielectric material. Therefore, surface plasmon cannot be excited only by entering light from dielectric material to metal.

To excite surface plasmon by light incident on metal, it is necessary to cause the dispersion relation of light existing in dielectric material to conform to the dispersion relation of surface plasmon by changing the dispersion relation of the light. One method for changing the dispersion relation of light is to provide a diffraction grating (grating) in an interface between dielectric material and metal as in this embodiment.

According to this method called a "grating coupling method", by entering light into a grating at a predetermined incidence angle, the wave number of light diffracted by the grating becomes equal to the wave number of surface plasmon, and the surface plasmon is consequently excited in the interface between the dielectric material and the metal.

Meanwhile, since surface plasmon, as described above, is a compressional wave, incoming light that excites surface plasmon to propagate in a specific direction must be linearly polarized light having an electric field component parallel to that direction. According to the above grating coupling method, the dispersion relation of light is changed by the grating in the direction parallel to the arrangement direction of the grating (grating vector). Specifically, what contributes to excitation of surface plasmon is the linearly polarized light having an electric field component parallel to the grating vector. Accordingly, as in this embodiment, since a grating including a plurality of protrusions 14a periodically arrayed in the x direction, each of which extends in the y direction, is provided in the interface between light guide body 11 and metal layer 12, surface plasmon can be excited in the above interface only when linearly polarized light that has an electric field component in the x direction and a predetermined incidence angle relative to the grating, enters to the above interface.

When the surface plasmon, in such a manner, is excited in first diffraction grating 14 by light, a completely opposite process of the excitation process of surface plasmon in first diffraction grating 14 occurs in second diffraction grating 15. This is because light guide body 11 and cover layer 13 have the same permittivity, and therefore the dispersion relations of surface plasmon described above are equal to each other in first diffraction grating 14 and in second diffraction grating 15. Further, by making metal layer 12 sufficiently thin to the degree of 100 nm or less, energy of the surface plasmon is exchanged between both ends of metal layer 12. In second diffraction grating 15, the same surface plasmon as that excited in first diffraction grating 14 is produced and generates light, and then it is output from second diffraction grating 15. The light to be output in such a manner is the same light as the light that excites surface plasmon in first diffraction grating 14, i.e. the TM polarized light, and the output angle is also equal to the incidence angle.

As described above, in this embodiment, first diffraction grating 14 and second diffraction grating 15 have the same optical configuration, which can allow the TM polarized light incident on first diffraction grating 14 to be output from second diffraction grating 15.

According to first diffraction grating 14 in this embodiment, even if light enters that has a propagation component other than in the x direction, a polarization component of light parallel to the x direction can excite surface plasmon as long as the incidence angle of the light projected onto the zx plane satisfies the excitation condition of surface plasmon. Also in this case, since the propagation direction of the surface plasmon is limited to the x direction, outgoing light generated by the light generation means with the surface plasmon is linearly polarized light having an electric field component in the x direction, i.e. the TM polarized light.

Next, referring to FIG. 1B, an operation will be described in which optical element 10 according to this embodiment converts the random polarized light from LED light source 1 into the TM polarized light and outputs it. It should be noted that even if light has a propagation component perpendicular to the zx plane, the following description of the operation within the zx plane relative to the excitation of surface plasmon, as described above, can apply to a component of the light projected onto the zx plane.

The randomly polarized light from LED light source 1 provided on one side surface of light guide body 11 enters light guide body 11, and propagates inside of light guide body 11. Surface plasmon is excited by TM polarized light that enters metal layer 12 at angle θ which satisfies the excitation condition of surface plasmon, from among the randomly polarized light propagating inside of light guide body 11, via first diffraction grating 14 (see the arrow A in FIG. 1B). At this time, the same surface plasmon is produced in second diffraction grating 15 (see the arrow B in FIG. 1B), and generates light. The light generated at this time is the same TM polarized light as the light that excites the surface plasmon in the interface between light guide body 11 and metal layer 12, and is output at the same angle $\theta_1$ as the incidence angle (see the arrow C in FIG. 1B).

On the other hand, light which does not satisfy the above excitation condition, i.e. the TE polarized light or, for example, the TM polarized light which is incident on metal layer 12 at incidence angle $\theta_2$ larger than angle $\theta_1$, is only reflected or diffracted in first diffraction grating 14, and does not excite surface plasmon. Such TE polarized light or TM polarized light is repeatedly reflected between metal layer 12 and diffuse reflection layer 18, and is subject to polarization conversion by λ/4 plate 17 and angle conversion by diffuse reflection layer 18. Then, when such light becomes TM polarized light that enters the metal layer at angle $\theta_1$, the light is output from the optical element via surface plasmon.

The TM polarized light that excites surface plasmon includes two types of light. One type is light that propagates within the zx plane in a +x direction accompanied by multiple reflection and enters metal layer 12 at incidence angle $\theta_1$. The other type is light that propagates within the zx plane in a −x direction accompanied by multiple reflection and enters metal layer 12 at incidence angle $-\theta_1$. Thus, TM polarized light that, after passing through metal layer 12, reaches cover layer 13 also has different outgoing directions (see the arrows C and C' in FIG. 1B). This light having a different outgoing direction is diffracted by diffraction means 16 provided on the exit surface of cover layer 13 to be output in a predetermined direction (the direction perpendicular to the exit surface in this embodiment, see the arrows D and D' in FIG. 1B).

Diffraction means 16 according to this embodiment has the same configuration as first and second diffraction gratings 14, 15. This is to diffract the light that is output from second diffraction grating 15 at two output angles $\theta_1$, $-\theta_1$, as described above, in a predetermined direction. Therefore, it is not necessary for the diffraction means according to this embodiment to have the same configuration as first and second diffraction gratings as long as the structures extending in the y direction are periodically arranged along the x direction. The shape of the structures and the interval between the structures are optionally modifiable depending on the incidence angle relative to the diffraction means and the desired output angle.

Further, in this embodiment, a single λ/4 plate is provided as a wave plate, but a combination of any other types of wave plates may be provided.

For a grating that allows surface plasmon to be excited by light, a parameter that changes the dispersion relation of light is a grating constant (pitch). Accordingly, a configuration of the grating is not limited to the configuration shown in FIGS. 1A and 1B. Thus, the cross-sectional shape of the protrusions that constitute first diffraction grating 14 according to this embodiment is modifiable in various ways.

FIGS. 2A to 2D are cross-sectional views illustrating some modifications of the first diffraction grating according to this embodiment, and show a cross-sectional shape in a direction orthogonal to the y direction.

Figure 2A:
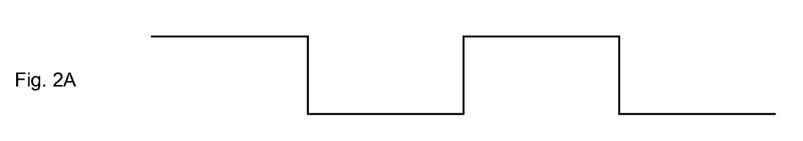
FIGS. 2A to 2D are cross-sectional views schematically illustrating a modification of a first diffraction grating in FIG. 1A.
Figure 2B:
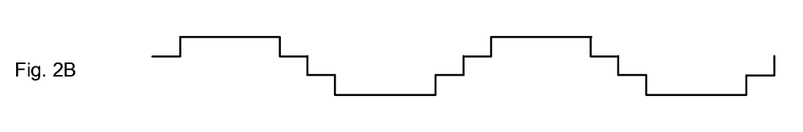
Figure 2C:
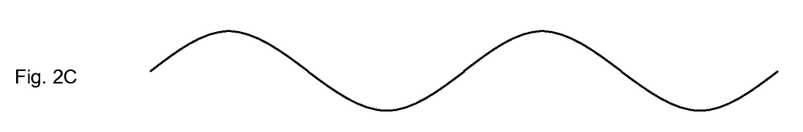
Figure 2D:
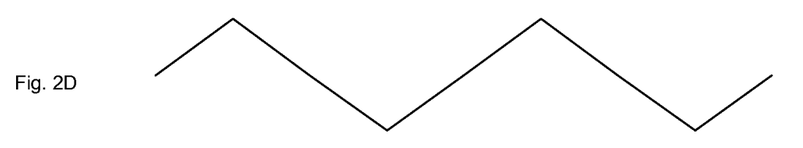

A rectangular cross-sectional shape shown in FIG. 2A is the cross section of diffraction gratings 14, 15 provided in optical element 10 shown in FIG. 1B. Other possible cross-sectional shapes may include a step shape (see FIG. 2B), a sinusoidal shape (see FIG. 2C), an isosceles triangle (see FIG. 2D) and the like. In the case of the step-like cross section shown in FIG. 2B, an increased number of steps can allow diffraction efficiency of first order diffraction to be improved. For example, in the case of four steps, the diffraction efficiency is 81%. Accordingly, from the view point of diffraction efficiency, a sinusoidal cross-sectional shape is most preferable for the diffraction grating provided in the interface between light guide body 11 and metal layer 12.

Next, referring to FIGS. 3A and 3B, the calculation result will be described, and the calculation is intended to set a pitch most suitable for the grating that can allow light use efficiency of the optical element to be maximized and surface plasmon to be excited using only first order diffraction.

As described above, the dispersion relation of surface plasmon is determined by permittivities of dielectric material and metal. Therefore, the condition of the grating and the incidence angle of light required for the excitation of surface plasmon largely changes based especially upon the material that is selected for metal. Accordingly, here, the calculation result will be described when glass is used for dielectric material and Ag is used for metal. Since Ag has a plasma frequency higher than the frequency bands of red light, green light and blue light and reflects, with high efficiency, light other than the light that satisfies the excitation condition of surface plasmon, Ag is the metal that can allow light use efficiency to be increased.

The calculation is carried out based on the grating coupling method within the zx plane. Specifically, for first diffraction grating 14 shown in FIG. 1B, when the interval between protrusions 14a, i.e. a grating constant (pitch) of first diffraction grating 14, is changed, then dispersion relations of surface plasmon and light are calculated, in which surface plasmon and light are in the interface between light guide body 11 and metal layer 12, and are parallel to the x direction. In this case, it is assumed that the permittivity of metal layer 12 (Ag) follows the Drude-Lorentz model.

Figure 3A:
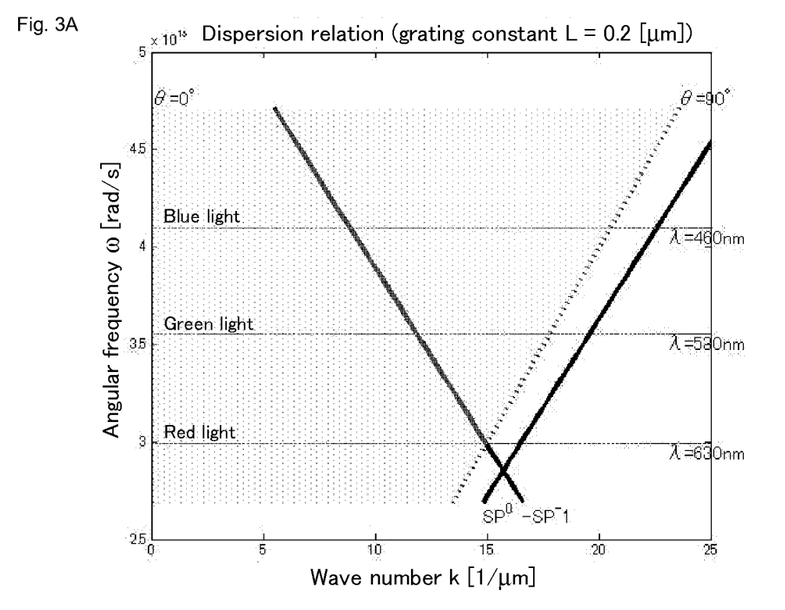
FIG. 3A is a graph showing the calculation result of a dispersion relation of light and a dispersion relation of surface plasmon when a grating constant of the first diffraction grating in FIG. 1A is set to be L=0.2 μm.

FIG. 3A shows the calculation result of the dispersion relations of surface plasmon and light when the grating constant of first diffraction grating 14 is set to be L=0.2 μm. The horizontal axis shows a wave number and the vertical axis shows an angular frequency. Also, FIG. 3A shows angular frequencies corresponding to red light (wavelength λ=630 nm), green light (λ=530 nm) and blue light (λ=450 nm), respectively.

Figure 3B:
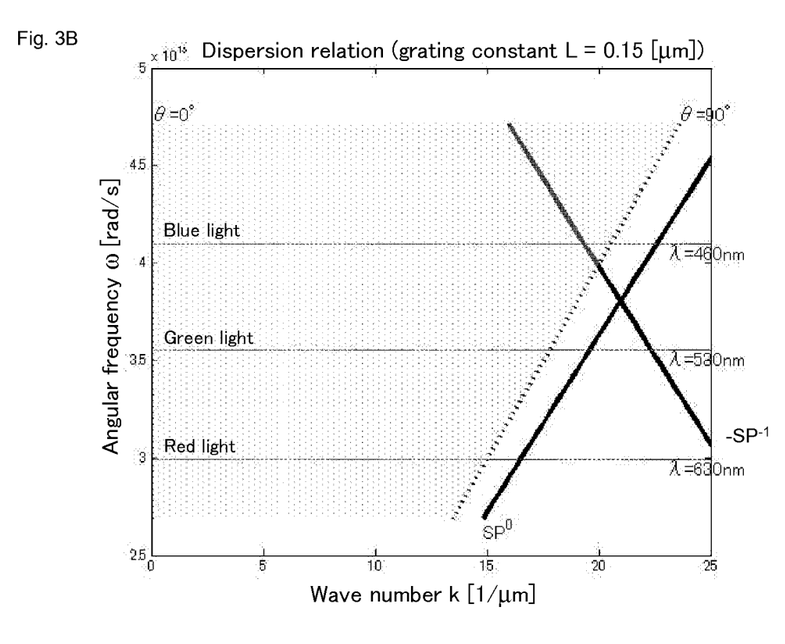
FIG. 3B is a graph showing the calculation result of a dispersion relation of light and a dispersion relation of surface plasmon when the grating constant of the first diffraction grating in FIG. 1A is set to be L=0.15 μm.

Shaded portions in FIGS. 3A and 3B show ranges which the dispersion relation of light can cover when light that propagates within the light guide body in the x direction enters the metal layer at the incidence angle of 0°<$\theta_1$<90°. On the other hand, solid lines (heavy lines) show the dispersion relation of the surface plasmon excited by first order diffraction. Accordingly, if there is an area where the solid lines and the shaded portions intersect with each other, light having energy corresponding to that area will be able to excite surface plasmon due to first order diffraction. In FIG. 3A, the solid line showing the dispersion relation of surface plasmon intersects with the shaded portion in the areas of red light (λ=630 nm), green light (λ=530 nm) and blue light (λ=460 nm). This means that first order diffraction of any incoming light from among red light, green light and blue light can excite surface plasmon in the case when the grating pitch is set to be L=0.2 µm.

FIG. 3B shows the calculation result of the dispersion relations of surface plasmon and light when the grating constant of first diffraction grating 14 is set to be L=0.15 µm. In this case, the dispersion relation of the surface plasmon excited due to first order diffraction will intersect with the shaded portion only in the area of blue light. Therefore, in the case when the grating pitch is set to be L=0.15 µm, only blue light can excite surface plasmon due to first order diffraction. Thus, in the case of the above condition, grating pitches are set to be equal to or larger than 0.2 µm for red light and green light, and equal to or larger than 0.15 µm for blue light, respectively, which can allow light to excite surface plasmon utilizing first order diffraction.

On the other hand, as the grating pitch increases, surface plasmon will be excited even by second or higher order diffraction, and as the grating pitch increases further, surface plasmon will be excited only by second or higher order diffraction, not by first order diffraction. Therefore, the grating pitches are preferably within the range where surface plasmon can be excited by first order diffraction, that is, within the range of $0.2\ \mu m \leq L \leq 4.2\ \mu m$ for red incoming light, within the range of $0.2\ \mu m \leq L \leq 3.5\ \mu m$ for green incoming light, and within the range of $0.15\ \mu m \leq L \leq 3.0\ \mu m$ for blue incoming light, respectively. Furthermore, the grating pitches are more preferably within the range where surface plasmon can be excited only by first order diffraction, that is, within the range of $0.2\ \mu m \leq L \leq 4.2\ \mu m$ for red incoming light, within the range of $0.2\ \mu m \leq L \leq 3.5\ \mu m$ for green incoming light, and within the range of $0.15\ \mu m \leq L \leq 3.0\ \mu m$ for blue incoming light, respectively. This is because if surface plasmon is excited by second or higher order diffraction, the surface plasmon will have a plurality of modes, and light that travels in a plurality of directions will be generated also on the side of the exit surface of the metal layer, depending on the modes of the surface plasmon. In other words, this is because when such an optical element is incorporated in an optical system of a projector, radiation angle becomes wider and light use efficiency decreases. Accordingly, if the excitation by second or higher order diffraction is included, it is necessary that the diffraction efficiency of first order diffraction achieve 100% and that the diffraction efficiency of second or higher order diffraction be 0% by forming the shape of the grating in a sinusoidal shape as much as possible. Describing the relation between pitch L of the grating and incidence angle $\theta_1$ of the light that excites surface plasmon, when L=0.35 µm, then $\theta_1=6°$ for red light, when L=0.3 µm, then $\theta_1=4°$ for green light, and when L=0.25 µm, then $\theta_1=7°$ for blue light.

For metal, for example, Al or Au may be used, and if used, the range where surface plasmon can be excited by first order diffraction is as follows. If Al is used, the ranges are $0.25\ \mu m \leq L \leq 0.4\ \mu m$ for red incoming light, $0.2\ \mu m \leq L \leq 0.3\ \mu m$ for green incoming light, and $0.2\ \mu m \leq L \leq 0.3\ \mu m$ for blue incoming light. If Au is used, the ranges are $0.2\ \mu m \leq L \leq 0.35\ \mu m$ for red incoming light, $0.2\ \mu m \leq L \leq 0.3\ \mu m$ for green incoming light, and $0.15\ \mu m \leq L \leq 0.25\ \mu m$ for blue incoming light.

Next, referring to FIG. 4, a projection display device (LED projector) will be described that includes an optical element according to this embodiment.

Figure 4:
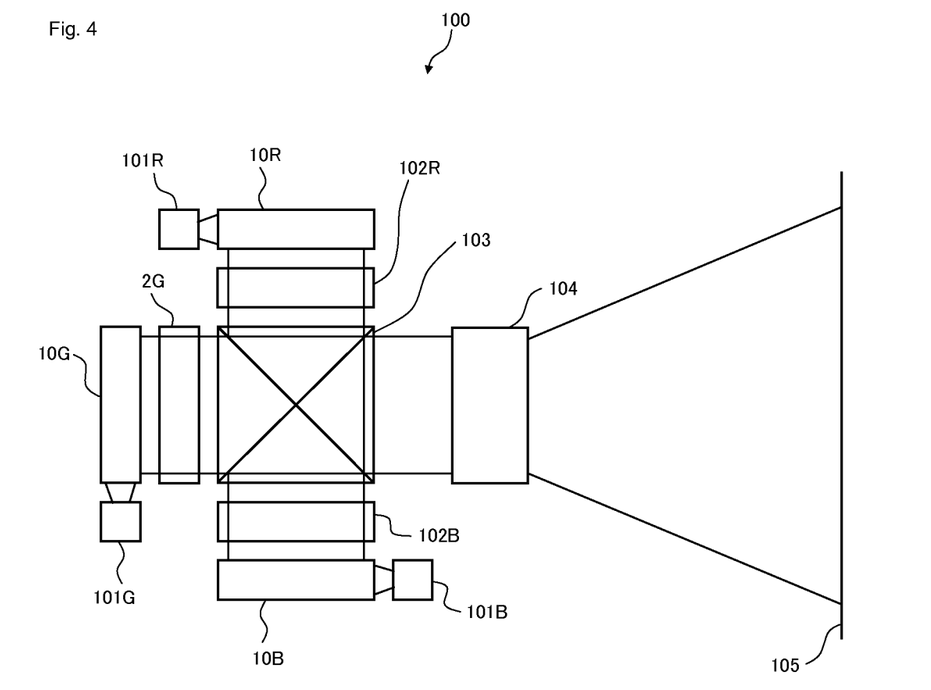
FIG. 4 is a layout plan schematically illustrating an example of a configuration of a projection display device including the optical element according to the first embodiment.

FIG. 4 is a layout plan schematically illustrating a configuration of an optical system in the LED projector according to this embodiment.

LED projector 100 according to this embodiment includes respective light source devices for red light (R), green light (G) and blue light (B), and each of the light source devices includes LED light sources 101R, 101G, 101B, and optical elements 10R, 10G, 10B according to this embodiment. Further, LED projector 100 includes liquid crystal panels (light modulation elements) 102R, 102G, 102B that each modulate colored light output from optical elements 10R, 10G, 10B, respectively, in accordance with image information. On the exit sides of liquid crystal panels 102R, 102G, 102B, cross dichroic prism 103 is provided that combines each colored light modulated by liquid crystal panels 102R, 102G, 102B, respectively, to be output. The light combined by cross dichroic prism 103 is projected onto screen 105 by projection optical system 104.

LED projector 100 that includes optical elements 10R, 10G, 10B according to this embodiment can convert the randomly polarized light output from LED light sources 101R, 101G, 101B, respectively, into the TM polarized light with high directionality, and project it onto each of liquid crystal panels 102R, 102G, 102B. This can allow light use efficiency in the optical system to be enhanced and an LED projector with high brightness to be realized.

In this embodiment, to change an angle of multiple-reflected light within light guide body 11, diffuse reflection layer 18 is used, but, without diffuse reflection layer 18, the lower surface of light guide body 11 may be slanted relative to its upper surface, not parallel to it. Alternatively, the shape on the side of the lower surface of light guide body 11 may be a periodic sawtooth shape formed in the direction along the grating vector of the first diffraction grating.

Second Embodiment

Figure 5:
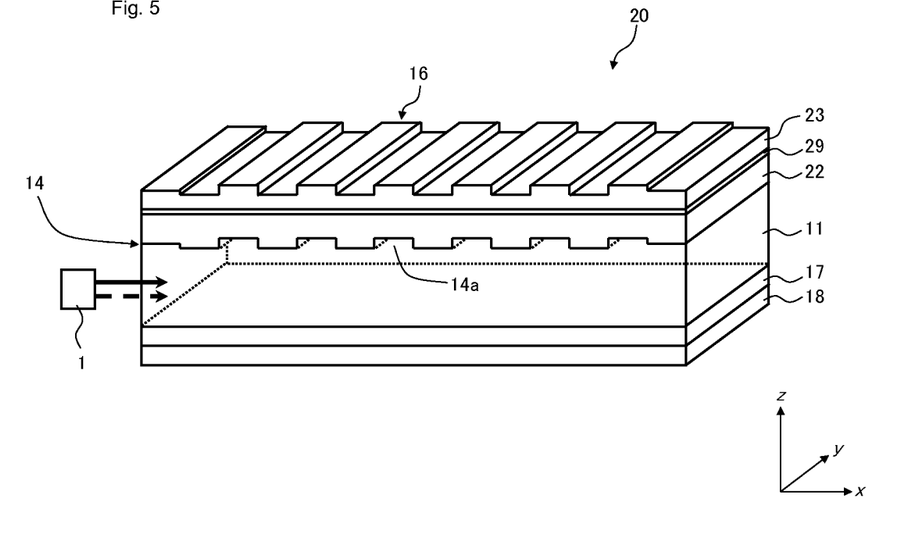
FIG. 5 is a perspective view schematically illustrating an optical element according to a second embodiment.

FIG. 5 is a perspective view schematically illustrating an optical element according to a second embodiment.

Optical element 20 according to this embodiment is a modification to optical element 10 according to the first embodiment in which a configuration of a light generation means is modified. The light generation means functions similarly to the first embodiment, but differs from the first embodiment in that the light generation means includes metal layer 22, cover layer 23, and low refractive index layer 29 inserted in the interface between them. In other words, in this embodiment, instead of second diffraction grating 15 according to the first embodiment, low refractive index layer 29 having a refractive index lower than that of cover layer 23 is provided in the interface between metal layer 22 and cover layer 23. Except for the above configuration, this embodiment is configured similarly to the first embodiment. In each of the embodiments described below, including this embodiment, the same reference numerals are used in each of the drawings for the same elements as that in the first embodiment, and description thereof will be omitted.

In the light generation means including metal layer 22, cover layer 23 and low refractive index layer 29, according to this embodiment, a so-called "Otto optical configuration" is accomplished, and the attenuated total reflection (ATR) method is used as a method that combines surface plasmon and light to generate light from the surface plasmon. In the ATR method, when light is totally reflected off an interface between dielectric material and a low refractive index layer, evanescent light occurs in the interface, and surface plasmon is excited by this evanescent light in an interface between the low refractive index layer and the metal. Therefore, in this embodiment, once surface plasmon is excited in first diffraction grating 14, the same surface plasmon is induced in the interface between metal layer 22 and low refractive index layer 29. Light is generated from the surface plasmon via the evanescent light that occurs in the interface between low refractive index layer 29 and cover layer 23, and radiated onto cover layer 23.

Third Embodiment

Figure 6:
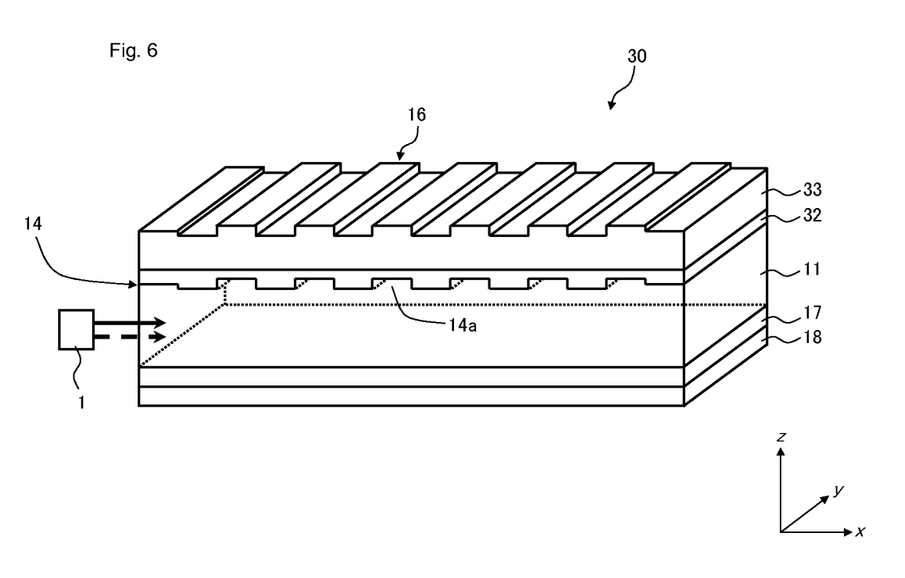
FIG. 6 is a perspective view schematically illustrating an optical element according to a third embodiment.

FIG. 6 is a perspective view schematically illustrating an optical element according to a third embodiment.

This embodiment, similarly to the second embodiment, is a modification to the first embodiment in which a configuration of a light generation means is modified, and differs in that metal layer 32 and cover layer 33 are configured differently from the above embodiments.

In optical element 30 according to this embodiment, cover layer 33 has a refractive index smaller than that of light guide body 11, and metal layer 32 has a film thickness extremely smaller than that of cover layer 33. The light generation means thus configured, which includes metal layer 32 and cover layer 33, has a so-called "Kretschmann optical configuration", and utilizes, similarly to the second embodiment, the ATR method to generate light from surface plasmon. Specifically, light is generated from surface plasmon that combines with surface plasmon in first diffraction grating 14 to be induced in the interface between metal layer 32 and cover layer 33, via evanescent light that occurs in that interface.

Fourth Embodiment

Next, referring FIGS. 7 to 9, an optical element according to a fourth embodiment will be described.

This embodiment is a modification to the embodiments described above in which a configuration on the exit side of the cover layer is modified. Here, this embodiment will be described as a modification from the first embodiment, but this embodiment can also apply to the second and third embodiments.

Figure 7:
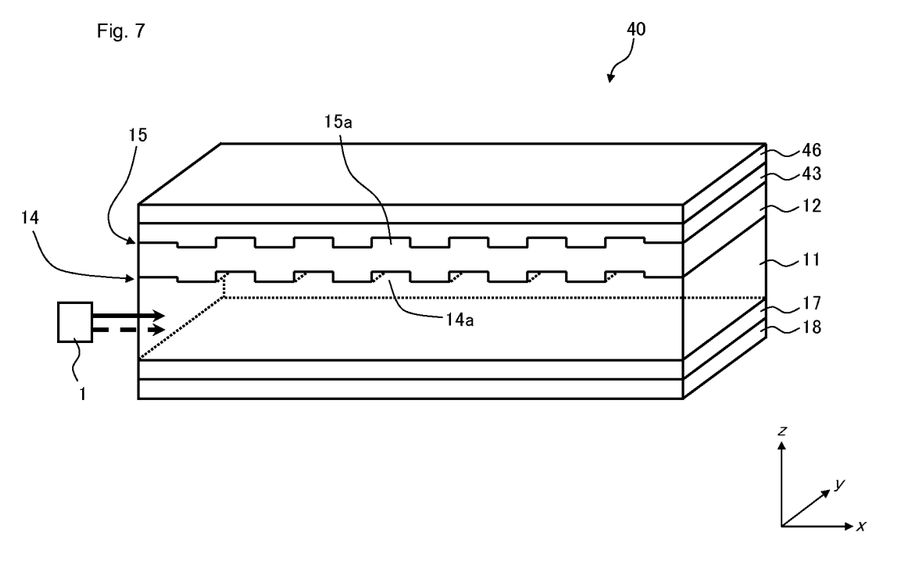
FIG. 7 is a perspective view schematically illustrating an optical element according to a fourth embodiment.
Figure 8:
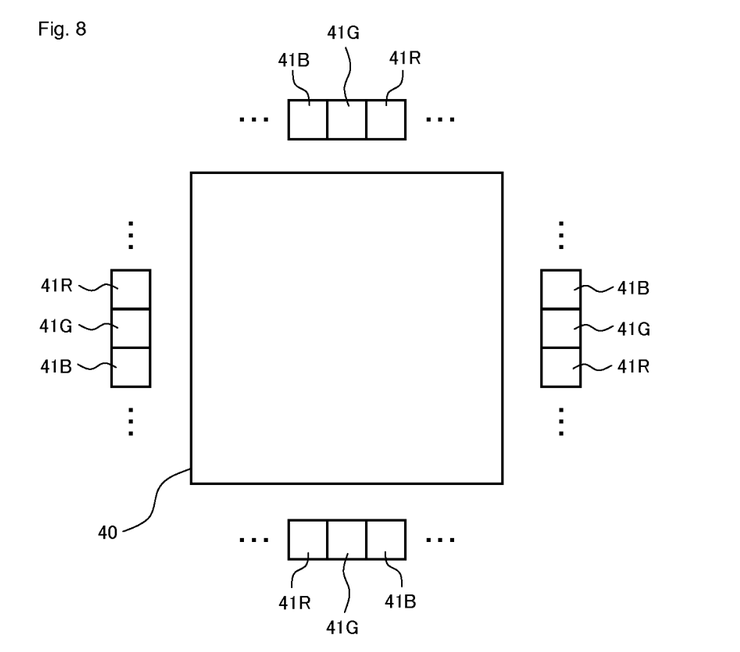
FIG. 8 is a perspective view schematically illustrating an example of a configuration of a projection display device including the optical element according to the fourth embodiment.

FIG. 7 is a perspective view schematically illustrating the optical element according to this embodiment. FIG. 8 is a layout plan schematically illustrating an example of the installation of an LED light source in the optical element according to this embodiment. FIG. 9 is a perspective view schematically illustrating an example of a configuration of an optical system in an LED projector including the optical element according to this embodiment.

In optical element 40 according to this embodiment, diffraction means 46 including a multiple hologram is provided on the side of the exit surface of cover layer 43, instead of diffraction means 16 according to the first embodiment that includes a plurality of structures. This multiple hologram is configured by laminating many holograms corresponding to red light, blue light and green light. Thus, as shown in FIG. 8, many LED light sources 41R, 41G, 41B having a different colored light, respectively, can be also disposed around one optical element 40 for it.

Figure 9:
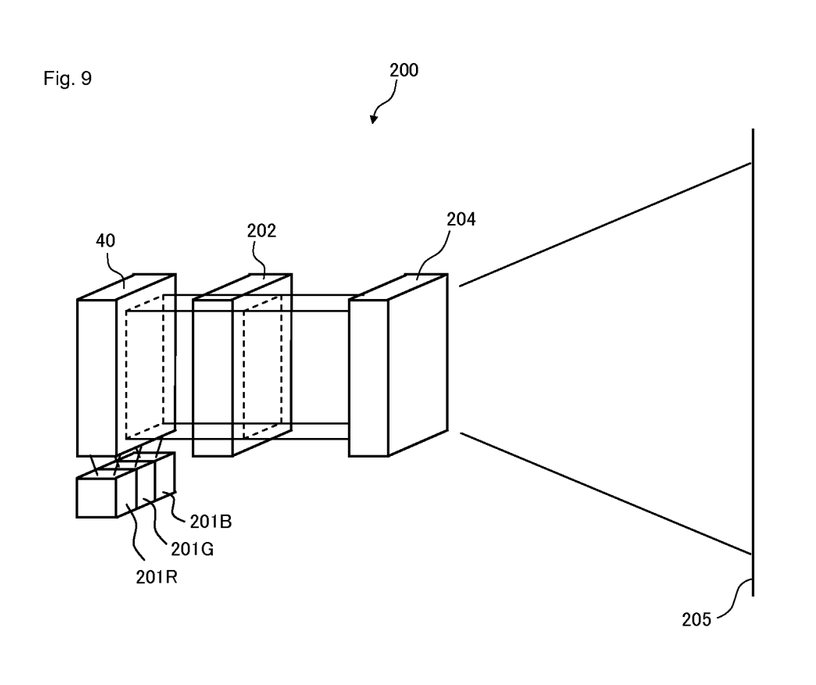
FIG. 9 is a perspective view schematically illustrating another example of a configuration of a projection display device including the optical element according to the fourth embodiment.

Further, use of optical element 40 according to this embodiment, as shown in FIG. 9, can configure LED projector 200 including one optical element 40 and one liquid crystal panel 202 provided for each of a plurality of LED light sources 201R, 201G, 201B. This LED projector 200 does not require installation of a cross dichroic prism, compared with LED projector 100 according to the first embodiment shown in FIG. 4, and therefore a further decrease in size can be achieved.

In LED projector 200 according to this embodiment, a reflective digital mirror device or the like may be used, instead of liquid crystal panel 202.

Fifth Embodiment

Figure 10A:
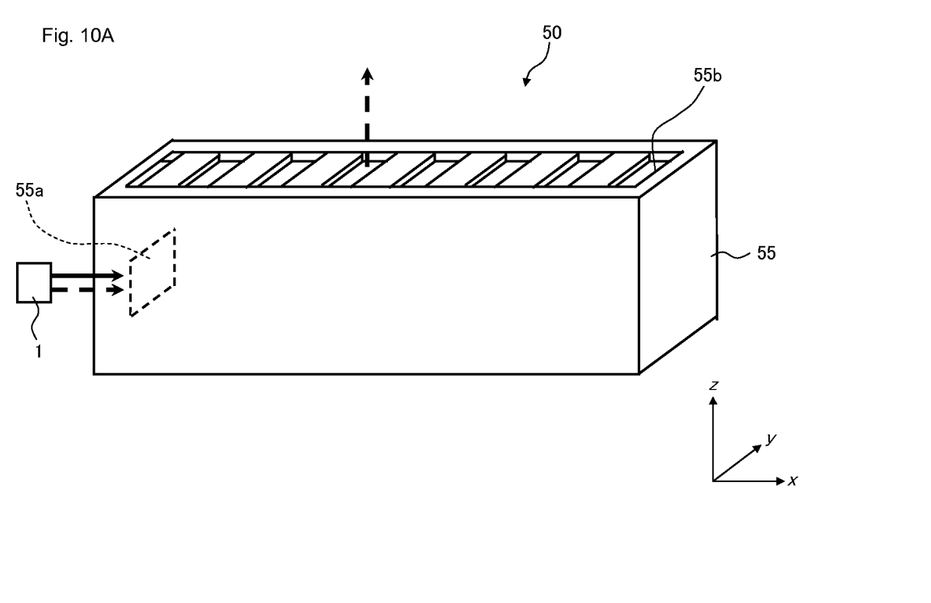
FIG. 10A is a perspective view schematically illustrating an optical element according to a fifth embodiment.
Figure 10B:
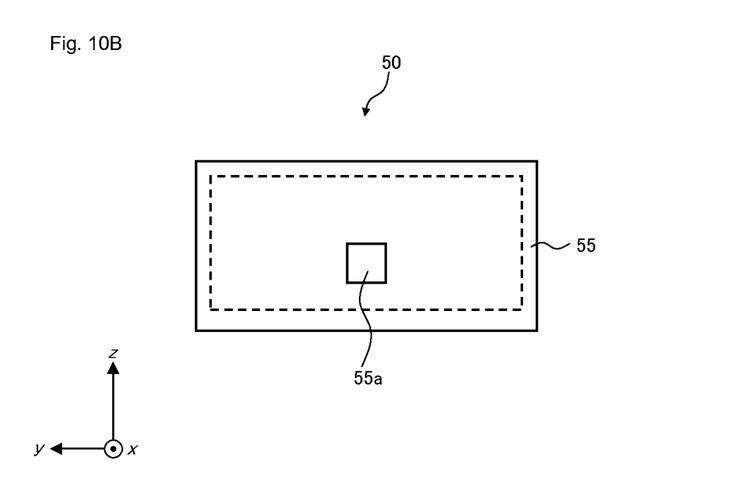
FIG. 10B is a side view schematically illustrating the optical element in FIG. 10A.

FIGS. 10A and 10B schematically illustrate an optical element according to a fifth embodiment. FIG. 10A is a perspective view schematically illustrating the optical element according to this embodiment, and FIG. 10B is a top view schematically illustrating the optical element according to this embodiment, seen from the direction of the light source.

This embodiment is a modification to the optical element according to the embodiments described above in which a diffuse reflection means is additionally provided so as to cover side surfaces except the upper and lower surfaces. This diffuse reflection means can apply to all the embodiments described above. FIGS. 10A and 10B show an example of a configuration in which the diffuse reflection means is applied to optical element 10 according to the first embodiment that includes the diffraction means including a plurality of structures.

Diffuse reflection means 55 according to this embodiment is provided with entrance 55a at a position opposite to LED light source 1. Light introduced inside of the light guide body therefrom is diffused and reflected not only off the lower surface but also off the side surfaces of the light guide body by diffuse reflection means 55. Therefore, since the light that is inside of the light guide body enters, without any loss, the surface plasmon excitation means, optical element 50 according to this embodiment can efficiently convert the randomly polarized light from the light source into the TM polarized light and output it.

Sixth Embodiment

Figure 11A:
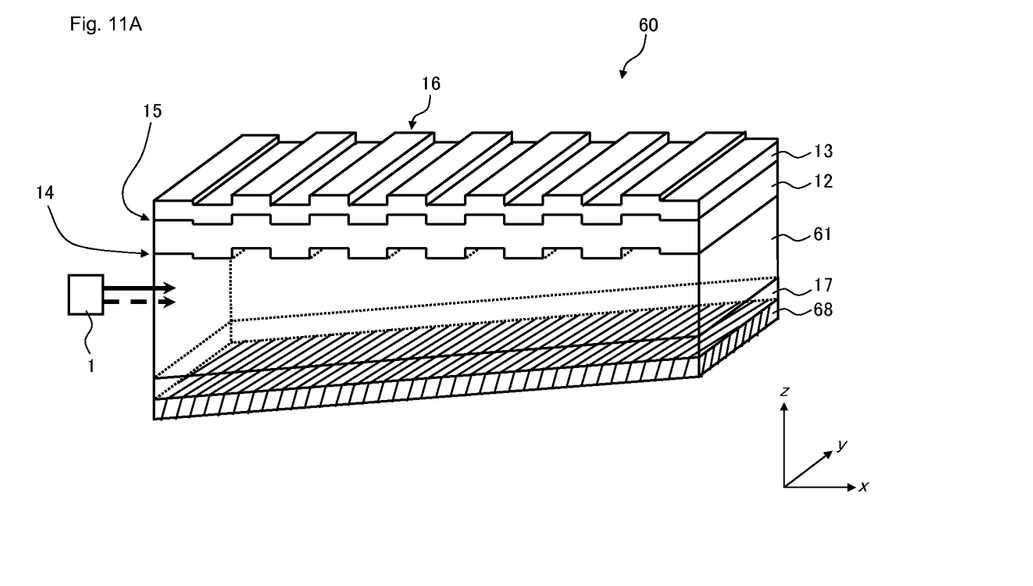
FIG. 11A is a perspective view schematically illustrating an optical element according to a sixth embodiment.
Figure 11B:
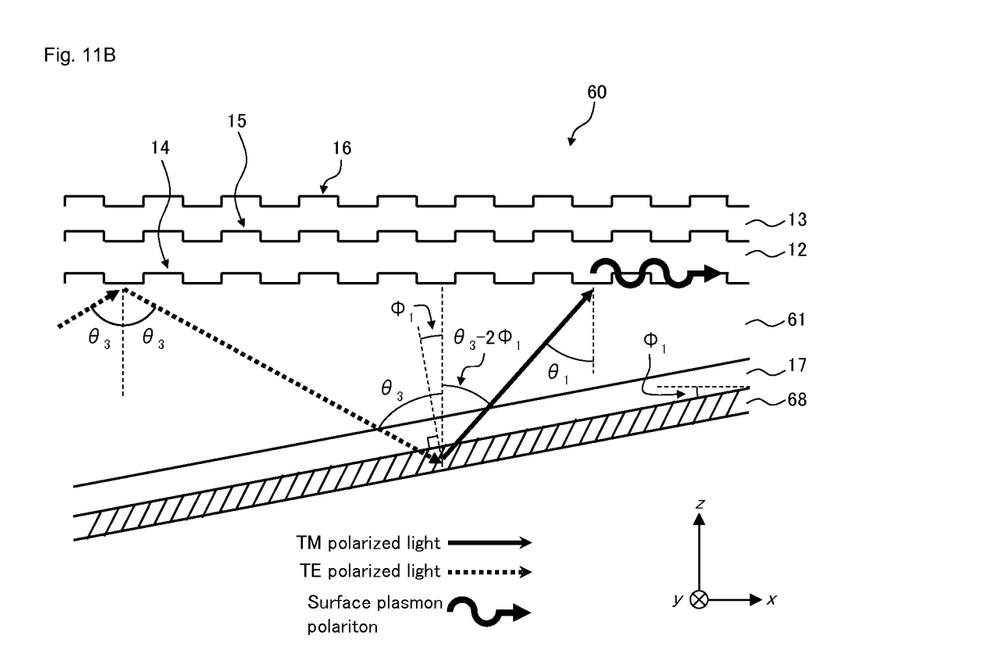
FIG. 11B is a cross-sectional view schematically illustrating the optical element in FIG. 11A.

FIGS. 11A and 11B schematically illustrate an optical element according to a sixth embodiment. FIG. 11A is a perspective view schematically illustrating the optical element according to this embodiment. FIG. 11B is a cross-sectional view schematically illustrating the optical element according to this embodiment, seen from the y direction.

This embodiment, similarly to the fifth embodiment, is a modification regarding light reflection within the light guide body. The change made in this embodiment can be applied to all the embodiments described above.

In optical element 60 according to this embodiment, light guide body 61 has the lower surface slanted relative to the upper surface such that the thickness of light guide body 61 becomes thinner in the light propagation direction (x direction). In response, in this embodiment, specular reflection layer 68 is provided as a means that reflects light off the lower surface of light guide body 61, instead of the diffuse reflection layer according to the embodiments described above. Referring to FIG. 11B, light reflection in such a configuration will be described below.

The TE polarized light reflected off the interface with metal layer 12, at an angle of reflection $\theta_3$ larger than incidence angle $\theta_1$ at which surface plasmon can be excited, enters specular reflection layer 68 at a similar incidence angle $\theta_3$. At this time, since light guide body 61 is slanted at tilt angle $\phi_1$, the light, after being reflected off specular reflection layer 68, is returned back inside of light guide body 61 at angle $\theta_3$-$\phi_1$ with respect to a normal direction of specular reflection layer 68. Specifically, the light converted into the TM polarized light because of passing through $\lambda/4$ plate 17 two times enters metal layer 12 at angle $\theta_3$-2$\phi_1$. When this angle $\theta_3$-2$\phi_1$ conforms to incidence angle $\theta_1$ at which surface plasmon can be excited, then surface plasmon is excited in the interface between light guide body 61 and metal layer 12.

While optical element 60 shown in FIGS. 11A and 11B is configured such that LED light source 1 is installed on the thicker side of light guide body 61 (left side seen in FIGS. 11A and 11B), LED light source 1 may be installed on the opposite side, that is, the light may be introduced from the thinner side of light guide body 61 (right side seen in FIGS. 11A and 11B).

Additionally, in optical element 60 according to this embodiment, the diffuse reflection layer according to the embodiments described above may be provided, instead of the specular reflection layer below the lower surface of the light guide body. In that case, the diffuse reflection means according to the fifth embodiment may be provided on the side surface of the light guide body.

On the other hand, in this embodiment, to change the reflection angle of light propagating inside of the light guide body, the lower surface of the light guide body is slanted, but alternatively a reflection means having a sawtooth shape may be provided on the lower surface parallel to the upper surface as shown in the first embodiment.

Seventh Embodiment

The optical element according to a seventh embodiment is a modification in which the first and second diffraction gratings according to the first embodiment are configured differently. Since the optical element according to this embodiment, due to this change, does not require the diffraction means provided in the optical element according to the first embodiment, as described below, this embodiment is advantageous compared with the first embodiment.

Figure 12A:
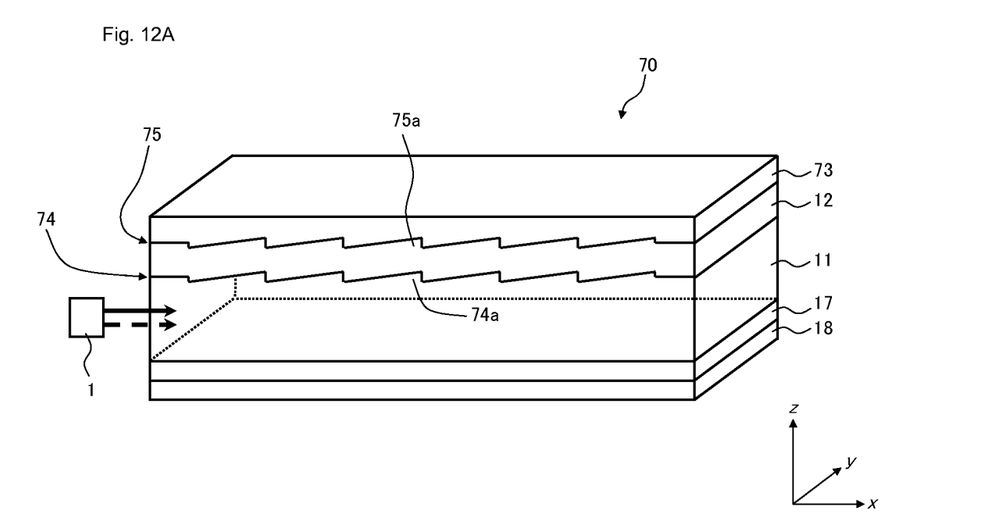
FIG. 12A is a perspective view schematically illustrating an optical element according to a seventh embodiment.
Figure 12B:
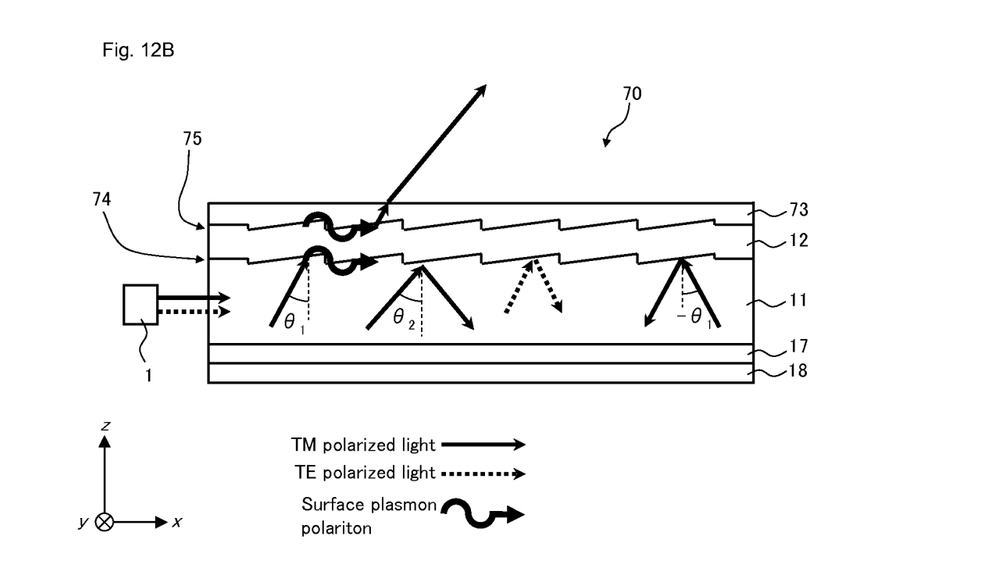
FIG. 12B is a cross-sectional view schematically illustrating the optical element in FIG. 12A.

FIGS. 12A and 12B schematically illustrate the optical element according to this embodiment. FIG. 12A is a schematic, perspective view and FIG. 12B is a schematic, cross-sectional view, seen from the y direction.

In optical element 70 according to this embodiment, respective protrusions 74a, 75a of diffraction gratings 74, 75 have a sawtooth cross-sectional shape, seen from the y direction. Light that propagates within the zx plane in the +x direction accompanied by multiple reflection and that enters such first diffraction grating 74 at incidence angle $\theta_1$ is not any more equivalent to light that propagates within the zx plane in the −x direction accompanied by multiple reflection and that enters at incidence angle $-\theta_1$, from the view point of change in dispersion relation by diffraction. That is, in this embodiment, by the diffraction in the first diffraction grating 74, only the dispersion relation of the light that propagates in the +x direction and that enters at incidence angle $\theta_1$ will conform to the dispersion relation of surface plasmon. Therefore, light that can pass through metal layer 12 via surface plasmon is only the light that enters metal layer 12 at incidence angle $\theta_1$.

At this time, incidence angle $\theta_1$ at which surface plasmon can be excited in the interface with metal layer 12, as described above, is modifiable depending on the permittivity of metal layer 12 and respective pitches of diffraction gratings 74, 75. Therefore, the above parameters are adjusted such that incidence angle $\theta_1$ at which light can pass through metal layer 12 is made smaller than the total reflection angle of cover layer 73, and light can be thus output in a predetermined direction, even if the diffraction means is not provided on the exit side of cover layer 73.

The protrusion of the diffraction gratings according to this embodiment may be asymmetrical with respect to a line passing through the apex of the protrusion and parallel to the z direction, in the cross section orthogonal to the y direction, and may be in a step-like shape.

Also, it should be noted that the changes made to the first embodiment in the second to sixth embodiments can be applied to this embodiment.

While the present invention has been described with reference to the embodiments and the examples, the present invention is not limited to the embodiments and the examples described above. It will be understood by those of ordinary skill in the art that various changes in form and details may be made therein without departing from the scope of the present invention.

The present application is based upon and claims the benefit of priority from Japanese Patent application No. 2010-077794, filed on Mar. 30, 2010, the disclosure of which is incorporated hereby in its entirety by reference.

EXPLANATION OF REFERENCE NUMERALS 1, 41R, 41G, 41B, 101R, 101G, 101B, 201R, 201G, 201B LED light source
10, 20, 30, 40, 50, 60, 70 Optical element
11, 61, 71 Light guide body
12, 22, 32 Metal layer
13, 23, 33, 43, 73 Cover layer
14, 74 First diffraction grating
14a, 74a Protrusions
15, 75 Second diffraction grating
16, 46 Diffraction means
17 $\lambda/4$ plate
18 Diffuse reflection layer
29 Low refractive index layer
55 Diffuse reflection means
55a Entrance
68 Specular reflection layer
102R, 102G, 102B, 202 Liquid crystal panel
100, 200 LED projector
104, 204 Projection optical system

What is claimed is:

1. An optical element, comprising:
a light guide body on which light is incident from a light source and which includes a first surface and a second surface opposite to the first surface;
a surface plasmon excitation means that is provided on the first surface of said light guide body and that allows surface plasmon to be excited by a specific polarization component of light whose polarization direction is orthogonal to a first direction in the first surface, from among the light entering from said light guide body;
a light generation means that includes a metal layer provided in the first surface of said light guide body through said surface plasmon excitation means, and a cover layer provided on a surface of said metal layer opposite to the surface facing said light guide body, and that generates light having the same polarization component as the specific polarization component of light, from surface plasmon produced in an interface between said metal layer and said cover layer in response to surface plasmon excited by the specific polarization component in said surface plasmon excitation means; and
a phase modulation layer that is provided within said light guide body and that changes a polarization direction of light propagating within said light guide body,
wherein said surface plasmon excitation means is a plurality of protrusions provided in an interface between said light guide body and said metal layer, and each of the plurality of protrusions extends in the first direction and is periodically arrayed along a second direction orthogonal to the first direction in the first surface.

2. The optical element according to claim 1, wherein said light generation means has the same configuration as that of said surface plasmon excitation means in the interface between said cover layer and said metal layer, and said cover layer has the same permittivity as that of said light guide body.

3. The optical element according to claim 1, wherein said light generation means includes a low refractive index layer that is inserted in the interface between said cover layer and said metal layer, and that has a refractive index lower than that of said cover layer.

4. The optical element according to claim 1, wherein said cover layer has a refractive index lower than that of said light guide body, and said metal layer has a film thickness thinner than that of said cover layer.

5. The optical element according to claim 1, wherein said metal layer includes Ag.

6. The optical element according to claim 5, wherein said surface plasmon excitation means allows surface plasmon to be excited by the specific polarization component of red light, and an interval between the plurality of protrusions in the second direction is in the range of 0.2 micrometer to 4.2 micrometer.

7. The optical element according to claim 5, wherein said surface plasmon excitation means allows surface plasmon to be excited by the specific polarization component of green light, and an interval between the plurality of protrusions in the second direction is in the range of 0.2 micrometer to 3.5 micrometer.

8. The optical element according to claim 5, wherein said surface plasmon excitation means allows surface plasmon to be excited by the specific polarization component of blue light, and an interval between the plurality of protrusions in the second direction is in the range of 0.15 micrometer to 3.0 micrometer.

9. The optical element according to claim 1, wherein said metal layer includes Au or Al.

10. The optical element according to claim 1, wherein the protrusion of said surface plasmon excitation means is symmetrical with respect to a line passing through an apex thereof and orthogonal to the second direction in a cross section that is orthogonal to the first direction.

11. The optical element according to claim 10, wherein the protrusions of said surface plasmon excitation means have a rectangular cross section orthogonal to the first direction.

12. The optical element according to claim 10, wherein the protrusions of said surface plasmon excitation means have a step-like cross section orthogonal to the first direction.

13. The optical element according to claim 10, wherein the protrusions of said surface plasmon excitation means have a sinusoidal cross section orthogonal to the first direction.

14. The optical element according to claim 10, wherein the protrusions of said surface plasmon excitation means have an isosceles triangular cross section orthogonal to the first direction.

15. The optical element according to claims 1, comprising a diffraction means that diffracts light propagating within said cover layer in the predetermined direction to output the light.

16. The optical element according to claim 15, wherein said diffraction means is a plurality of structures provided on an exit surface of said cover layer, and each of the plurality of structures extends in the first direction and is periodically arrayed along the second direction.

17. The optical element according to claim 15, wherein said diffraction means is a hologram.

18. The optical element according to claim 1, wherein the protrusions of said surface plasmon excitation means are unsymmetrical with respect to a line passing through an apex thereof and orthogonal to the second direction in the cross section that is orthogonal to the first direction.

19. The optical element according to claim 18, wherein the protrusions of said surface plasmon excitation means have a sawtooth cross section orthogonal to the first direction.

20. The optical element according to claim 18, wherein the protrusions of said surface plasmon excitation means have a step-like cross section orthogonal to the first direction.

21. The optical element according to claim 1, wherein the second surface of said light guide body is slanted relative to the first surface.

22. The optical element according to claim 1, wherein the second surface of said light guide body has a sawtooth cross section orthogonal to the first direction.

23. The optical element according to claim 1, comprising a reflection layer provided on the second surface of said light guide body.

24. The optical element according to claim 23, wherein said reflection layer includes a diffuser that diffuses and reflects incoming light.

25. The optical element according to claim 3, wherein said phase modulation layer is inserted between said light guide body and said reflection layer.

26. The optical element according to claim 23, further comprising a reflection means that is provided to cover other surfaces of said light guide body except the first and second surfaces, and includes an entrance through which light enters said light guide body.

27. The optical element according to claims 1, wherein said phase modulation layer is a wave plate that imparts a phase difference to light passing therethrough.

28. A light source device comprising:
   the optical element according to claim 1; and
   the light source provided in an outer periphery of said light guide body.

29. The light source device according to claim 28, wherein said light source is a solid state light source.

30. A projection display device comprising: the light source device according to claim 28; a light modulation element that modulates light output from said light source device in accordance with an image signal; and a projection optical system that projects the light modulated by said light modulation element.

* * * * *